(12) United States Patent
Kawamoto et al.

(10) Patent No.: US 11,564,347 B2
(45) Date of Patent: Jan. 31, 2023

(54) WORK VEHICLE

(71) Applicant: Kubota Corporation, Osaka (JP)

(72) Inventors: Kazuyoshi Kawamoto, Sakai (JP); Eiji Sato, Sakai (JP); Yuta Horibe, Sakai (JP); Takashi Kumashiro, Sakai (JP); Tomohisa Yamamoto, Sakai (JP); Akihito Mihara, Sakai (JP)

(73) Assignee: Kubota Corporation, Osaka (JP)

( * ) Notice: Subject to any disclaimer, the term of this patent is extended or adjusted under 35 U.S.C. 154(b) by 113 days.

(21) Appl. No.: 17/028,148

(22) Filed: Sep. 22, 2020

(65) Prior Publication Data

US 2021/0000007 A1   Jan. 7, 2021

Related U.S. Application Data

(62) Division of application No. 15/825,371, filed on Nov. 29, 2017, now Pat. No. 10,820,492.

(30) Foreign Application Priority Data

Dec. 12, 2016 (JP) .............................. JP2016-240526
Dec. 27, 2016 (JP) .............................. JP2016-253472

(51) Int. Cl.
*A01D 34/00* (2006.01)
*A01D 34/64* (2006.01)
*A01D 43/063* (2006.01)
*A01D 75/00* (2006.01)
*B60Q 5/00* (2006.01)
*G06Q 10/06* (2012.01)
(Continued)

(52) U.S. Cl.
CPC ........... *A01D 34/006* (2013.01); *A01D 34/64* (2013.01); *A01D 43/063* (2013.01); *A01D 43/0631* (2013.01); *A01D 43/0635* (2013.01); *A01D 75/00* (2013.01); *B60Q 5/005* (2013.01); *G06Q 10/06* (2013.01); *G06Q 10/0635* (2013.01); *G06Q 50/02* (2013.01); *A01D 2101/00* (2013.01)

(58) Field of Classification Search
CPC .... A01D 34/006; A01D 34/64; A01D 43/063; A01D 43/0631; A01D 43/0635; A01D 75/00; A01D 2101/00; B60Q 5/005; G06Q 10/06; G06Q 10/0635; G06Q 50/02
USPC ........................................................... 701/34
See application file for complete search history.

(56) References Cited

U.S. PATENT DOCUMENTS

| | | | |
|---|---|---|---|
| 2005/0072135 A1 | 4/2005 | Kormann | |
| 2011/0022267 A1 | 1/2011 | Murphy | |
| | (Continued) | | |

FOREIGN PATENT DOCUMENTS

| | | | |
|---|---|---|---|
| JP | 6303824 A | 11/1994 | |
| JP | 1056813 A | 3/1998 | |
| | (Continued) | | |

*Primary Examiner* — Abby Y Lin
*Assistant Examiner* — Hossam M Abd El Latif
(74) *Attorney, Agent, or Firm* — The Webb Law Firm

(57) ABSTRACT

A work vehicle includes a cutter device for cutting plant in a field, a storage section for storing plant cut by the cutter device, an inclination angle sensor for detecting an inclination angle (($\theta d$)) of the vehicle body, a display device for displaying the inclination angle detected by the inclination angle sensor, and a reporting device for reporting the inclination angle exceeding a permissible inclination angle (($\theta a$)).

4 Claims, 11 Drawing Sheets

(51) Int. Cl.
  *G06Q 50/02*    (2012.01)
  *A01D 101/00*   (2006.01)

(56)     References Cited

U.S. PATENT DOCUMENTS

2011/0061762 A1   3/2011   Madsen et al.
2012/0167537 A1   7/2012   Corriher
2014/0266664 A1   9/2014   Dwyer
2015/0112542 A1*  4/2015   Fuglewicz ........... G07C 5/0858
                                                            701/1
2016/0152262 A1   6/2016   Laurin et al.
2017/0202138 A1   7/2017   Pellenc
2018/0044109 A1*  2/2018   Butcher ................... B65F 3/00
2019/0241124 A1*  8/2019   Izumikawa ............... E02F 9/26

FOREIGN PATENT DOCUMENTS

JP          200044174  A      2/2000
JP         2003317163  A     11/2003
JP         2006188353  A1     7/2006
JP         2014060971  A      4/2014
JP         2015108956  A      6/2015

\* cited by examiner

WORK VEHICLE

CROSS REFERENCE TO RELATED APPLICATIONS

This application is a divisional of U.S. patent application Ser. No. 15/825,371, filed on Nov. 29, 2017, which claims priority to Japanese Patent Application Nos. 2016-240526 and 2016-253472, filed Dec. 12, 2016 and Dec. 27, 2016, respectively, the disclosures of which are hereby incorporated by reference in their entireties.

BACKGROUND OF THE INVENTION

1. Field of the Invention

This invention relates to a work vehicle such as a riding type grass mower or a grass mower, a combine, etc.

2. Description of the Related Art

(1) First Related Art

A conventional work vehicle is disclosed in JP 2014-060971 A for example. This work vehicle (a "combine" in JP 2014-060971 A) includes a cutter device (a "cutting section" in JP 2014-060971 A) for cutting plant in a field, a storage section (a "grain tank" in JP 2014-060971 A) for storing cut plant, and an inclination angle sensor (an "inclination angle detection sensor" in JP 2014-060971 A) for detecting an inclination angle of a vehicle body.

With this work vehicle, if an inclination angle of the vehicle body exceeds a threshold value, a bending/stretching operation of a grain discharge auger for discharging grains inside the storage section to the outside is not effected. However, since the driver cannot clearly recognize to what extent the vehicle is inclined. Hence, there is a need for a work vehicle that allows such recognition.

(2) Second Related Art

A conventional work vehicle mounting a utility implement is disclosed in JP 2003-317163 A, for example. This work vehicle is a fork lift having an approach alarming device. According to a configuration of this approach alarming device, a wireless transmitter capable of transmitting a predetermined code for alarming signal is provided in the fork lift, and also a worker is caused to carry a wireless receiver capable of generating an alarm sound upon receipt of radio wave reached from a predetermined distance. With this, when the fork lift approaches a worker present within a preset distance, approaching of the transporting vehicle can be reported to this worker by the alarm sound.

With this approach alarming device, if the worker fails to carry the wireless receiver, the alarm sound is not generated.

Further, a worker often needs to approach the fork lift for a particular work. However, if the worker is carrying the wireless receiver, the alarm sound will be kept generated to interfere with the work. So that, it is necessary to power OFF the wireless receiver or the wireless transmitter. After completion of the work, the approach alarm device will not function until the power to the wireless receiver or the wireless transmitter is turned ON again. Further, in a location where approach alarm can be frequently generated or in case a worker who receives such approaching alarm is frequently present, it is necessary to check such location or the worker for the sake of danger management. However, such management is not taken into consideration.

In view of the above, there is a need for a work vehicle which is improved in the respect of danger management.

SUMMARY OF THE INVENTION (1) In view of First Related Art, there is proposed a work vehicle configured as follows.

A work vehicle comprising:
a vehicle body;
a cutter device for cutting plant in a field;
a storage section for storing plant cut by the cutter device;
an inclination angle sensor for detecting an inclination angle of the vehicle body;
a display device for displaying the inclination angle detected by the inclination angle sensor; and
a reporting device for reporting the inclination angle exceeding a permissible inclination angle.

With this configuration, by viewing an inclination angle of the vehicle body displayed on the display device, the driver can clearly recognize the inclination angle of the vehicle body. Moreover, exceeding of the permissible inclination angle by the inclination angle is reported by the reporting device, whereby it is possible to call the driver's attention on the fact of the vehicle body being inclined in excess of the permissible inclination angle.

According to one preferred embodiment, the work vehicle further comprises:
a weight sensor for detecting a weight of stored object inside the storage section;
wherein the permissible inclination angle is set as a function of the weight detected by the weight sensor.

The greater the weight of the stored object inside the storage section, the greater the influence of the vehicle body inclination on the vehicle body balance. With the above arrangement, by decreasing the permissible inclination angle in accordance with increase of the weight of the stored object inside the storage section, it is possible to maintain the vehicle body balance favorably.

According to one preferred embodiment, the work vehicle further comprises:
a traveling device;
a braking device for braking the traveling device; and
a braking instruction section for instructing an braking operation to the braking device if the inclination angle detected by the inclination angle sensor exceeds the permissible inclination angle.

When the inclination angle of the vehicle body is exceeding the permissible inclination angle, if the vehicle speed is too high, the vehicle body inclination gives greater influence on the vehicle body balance. With the above-described arrangement, even when the inclination angle of the vehicle body is exceeding the permissible inclination angle, the traveling device is braked by the braking device, so it is possible to maintain the vehicle body balance favorably.

According to one preferred embodiment, the work vehicle further comprises:
a gravity center position calculation section for calculating a gravity center of the stored object inside the storage section;
wherein the permissible inclination angle is set as a function of the gravity center position calculated by the gravity center position calculation section.

The greater displacement/deviation of the gravity center position of the stored object inside the storage section relative to a reference gravity center, the greater the influence of the vehicle body inclination on the vehicle body balance. With the above-described arrangement, the permissible inclination angle is decreased as the displacement of the gravity center position of the stored object inside the storage section increases, so it is possible to maintain the vehicle body balance favorably.

According to one preferred embodiment, the work vehicle further comprises:

a vehicle speed sensor for detecting a vehicle speed of the work vehicle;

wherein the permissible inclination angle is set as a function of the vehicle speed detected by the vehicle speed sensor.

The higher the vehicle speed, the greater the influence of the vehicle body inclination on the vehicle body balance. With the above-described arrangement, by decreasing the permissible inclination angle in accordance with increase of the vehicle speed, it is possible to maintain the vehicle body balance favorably.

According to one preferred embodiment, the work vehicle further comprises:

a reporting instruction section for instructing a reporting operation to the reporting device if the inclination angle detected by the inclination angle sensor exceeds the permissible inclination angle;

a position information acquisition section for acquiring position information of the vehicle body; and a correlation section for correlating the position information acquired by the position information acquisition section with information of instruction by the reporting instruction section of the reporting operation to the reporting device.

With the above-described arrangement, by correlating the position information acquired by the position information acquisition section with information of instruction by the reporting instruction section of the reporting operation to the reporting device, it is possible to obtain information useful in carrying out safety management of work (e.g. agricultural field map).

According to one preferred embodiment, the storage section is disposed at a rear portion of the vehicle body.

In case the storage section is disposed at a rear portion of the vehicle body, there is a concern that the weight of the stored object inside the storage section may cause rearwardly downward inclination of the vehicle body. With the above-described arrangement, with the work vehicle mounting the storage section at a rear portion of the vehicle body, the driver can clearly recognize the inclination angle of the vehicle body and also, it is possible to call the driver's attention to the vehicle body being inclined in excess of the permissible inclination angle.

According to one preferred embodiment, the work vehicle comprises a riding type grass mower.

For such riding type grass mower, in case it mounts a grass collecting container for collecting cut grass, there is a concern that the weight of collected grass inside the grass collecting container may cause inclination of the vehicle body. With the above-described arrangement, with the work vehicle mounting the storage section at a rear portion of the vehicle body, the driver can clearly recognize the inclination angle of the vehicle body and also, it is possible to call the driver's attention to the vehicle body being inclined in excess of the permissible inclination angle.

(2) In view of Second Related Art, there is proposed a work vehicle configured as follows.

A work vehicle mounting a utility implement comprising:

a self vehicle position detection section for detecting a self position of the vehicle;

a work state detection sensor group for detecting states of the utility implement;

at least one man-sensitive sensor;

a danger determination section for determining danger occurring between the utility implement and a man detected by the man-sensitive sensor, based on state detection signals from the work state detection sensor group and a man-sensing detection signal from the man-sensitive sensor;

a reporting section for reporting a danger avoiding alarm based on danger determined by the danger determination section; and a danger management information generation section for generating danger management information by combining danger information including a content of the danger and position information containing the self vehicle position at the time of occurrence of the danger.

With the above-described arrangement, it is possible to infer a state of the utility implement from state detection signals from the work state detection sensor group. Also, based on a man-sensing detection signal from the man-sensitive sensor, it is possible to infer presence of a man at a particular location. Then, based on these, if it is determined that danger is present between the utility implement and the man, namely, if presence of danger is determined, a danger avoiding alarm will be reported to avoid such danger. With this reporting, the man exposed to the danger can move away from the dangerous state. Further, the content of such danger, e.g. danger information including approach of the utility implement to the man present at the dangerous location, the position of the occurrence of this danger, namely, the position (self vehicle position) of the work vehicle are combined to generate the danger management information. Therefore, by checking thus generated danger management information, more effective danger management becomes possible.

According to one preferred embodiment, the work vehicle further comprises:

a communication section that transmits to a management computer via a communication network;

wherein the communication section is configured to transmit, to the management computer, work vehicle management information comprised of the danger management information added with identity information of the work vehicle and identity information of the driver of the work vehicle.

With the above-described arrangement, the content of the danger including the location of occurrence is added with information that identifies the work vehicle and its driver exposed to the occurrence of the danger and then transmitted to the management computer. With this, the management computer can statistically process and study dangers occurring with all of work vehicles and drivers under its management. Here, it is understood that the word "driver" is used as a generic term including a managing person riding on this work vehicle as well as a managing person who manages this work vehicle. Therefore, at the time of occurrence of danger, this occurrence of danger can be informed from the management computer side to the driver via e.g. a mobile phone.

Incidentally, the utility implements include an implement whose height and/or posture can be changed by a lift mechanism, e.g. a fork of a fork lift, a grass collecting container of a grass mower, etc. According to one preferred embodiment, at least one man-sensitive sensor constituting the man-sensitive sensor is disposed to sense a person present in the vicinity of the implement; and if the man-sensitive sensor senses a man when the implement is located at its elevated position, the danger avoiding alarm is reported.

Presence or approaching of a man (a person) in the vicinity downwardly of the implement when this implement is located at its elevated position presents a danger, which must be avoided. With the above-described arrangement, based on a signal indicating the implement being located at the elevated position and a signal indicating sensing of a man in the vicinity of the implement, danger is determined, and a danger avoiding alarm is reported by means of a buzzer, a voice. With this, the danger can be avoided. Further, by checking the danger management information recorded over time, it is also possible to call the attention of a driver to which dangerous action occurs frequently.

On the other hand, if the man-sensitive sensor is kept ON, even in a situation where no danger occurs, determination of danger using the man-sensitive sensor will be effected wastefully. For this reason, in a situation when/where no danger occurs, it is preferred to keep the function of the corresponding man-sensitive sensor OFF. For this reason, according to one preferred embodiment, the man-sensitive sensor is configured to be turned OFF when the utility implement is located at a lowered position and to be turned ON when the utility implement is located at an elevated position.

Further and other features and advantageous effects achieved thereby will become apparent upon reading the following explanation with reference to the accompanying drawings.

DETAILED DESCRIPTION OF PREFERRED EMBODIMENTS

First Embodiment

Figure 1:
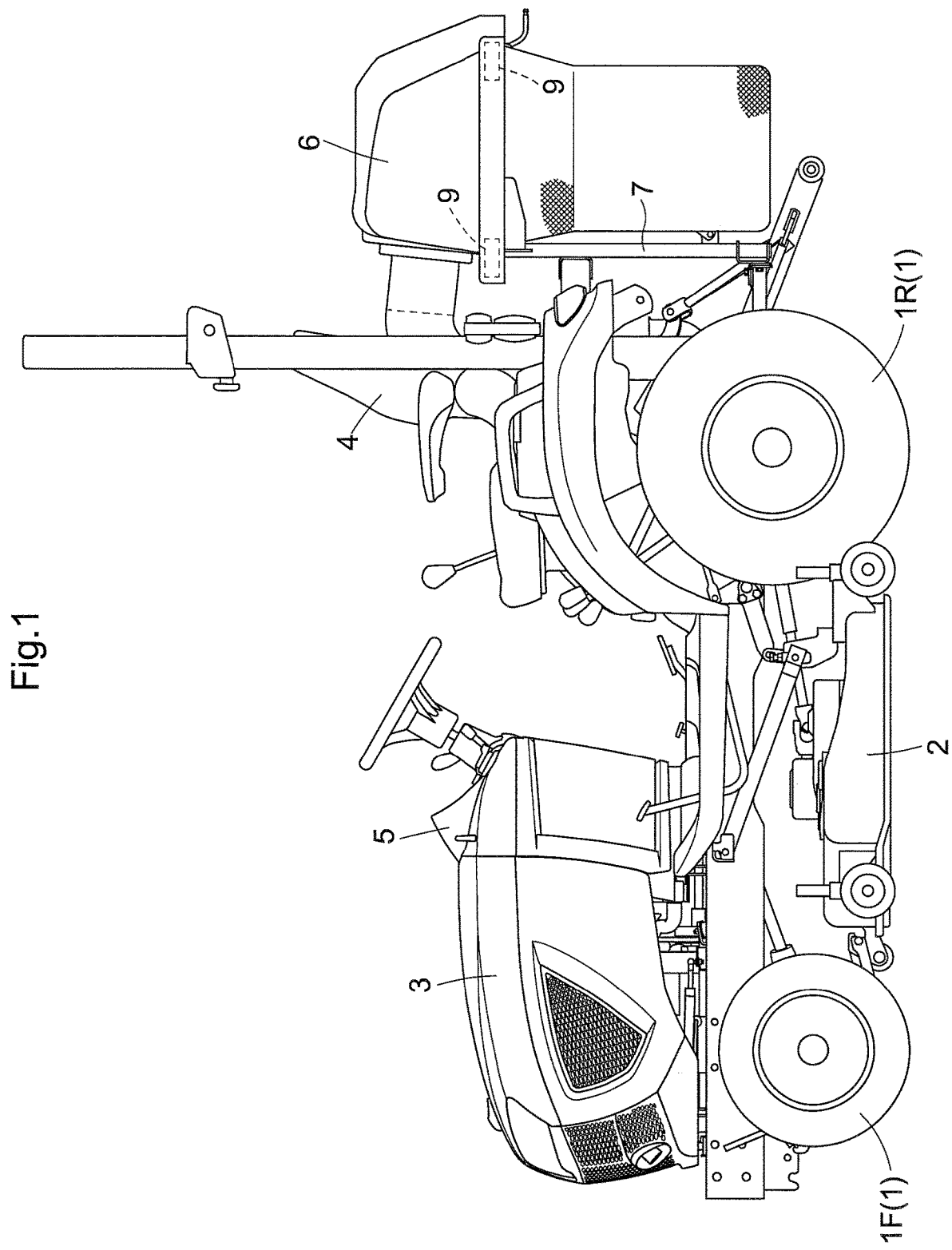
FIG. 1 is a left side view showing a riding type grass mower as an example of a work vehicle, according to a first embodiment (same applied to the subsequent drawings up to FIG. 3)
Figure 2:
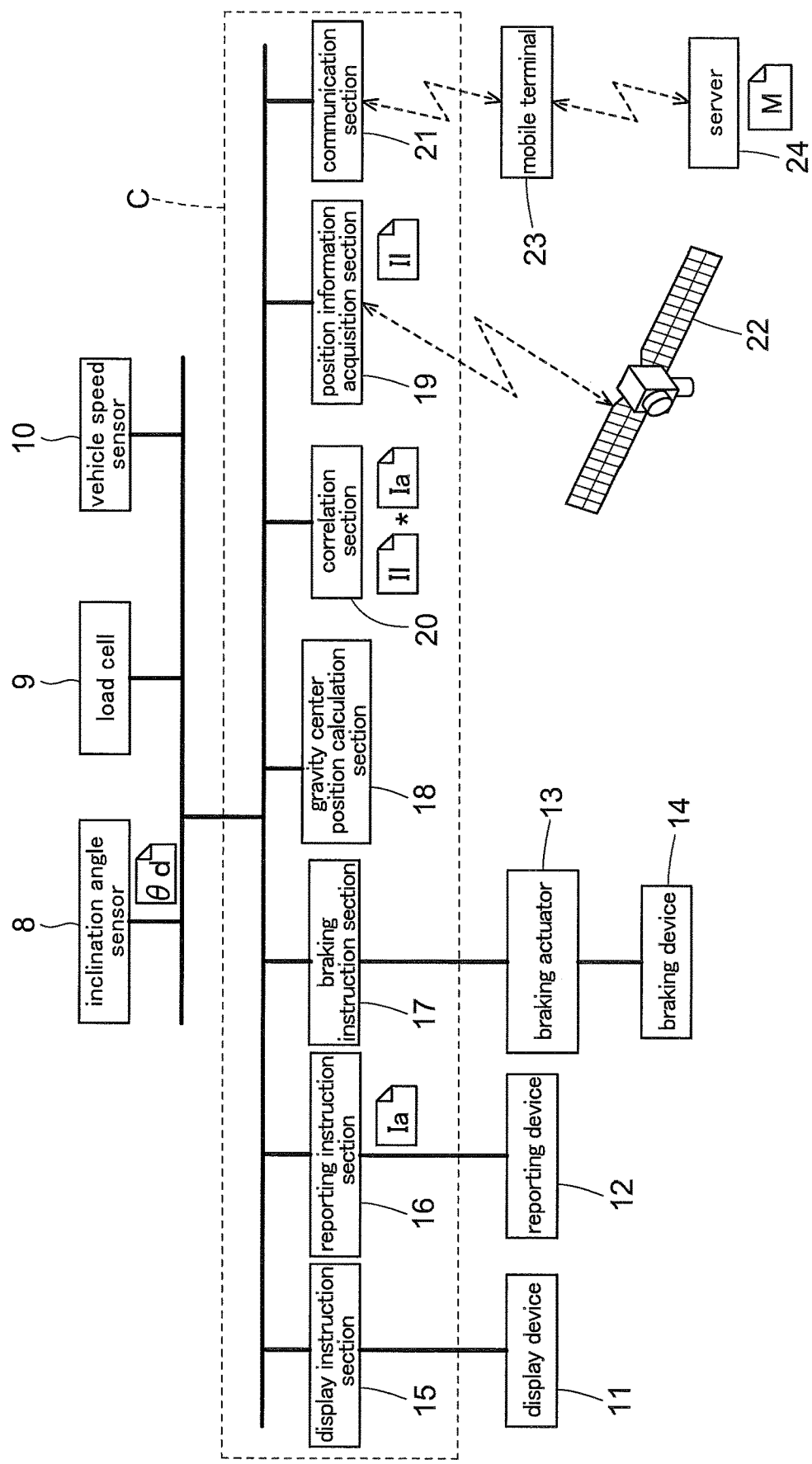
FIG. 2 is a diagram showing control blocks.

A first embodiment will be described next with reference to FIGS. 1-3.
[General Configuration]
FIG. 1 shows a riding type grass mower as an example of a "work vehicle" according to the disclosure. Namely, in the illustrated embodiment, lawn (grass) is assumed as "plant" according to the disclosure. The riding type grass mower includes a traveling vehicle body 1. The traveling vehicle body 1 includes a pair of right and left front wheels 1F and a pair of right and left rear wheels 1R. Between the front wheels 1F and the rear wheels 1R, a mower deck 2 is provided for cutting grass in a field (corresponding to a "cutter device" according to the disclosure). At a front portion of a vehicle body, a hood 3 is provided for accommodating e.g. an engine (not shown). A driver's seat 4 is provided at a rear portion of the vehicle body. A meter panel 5 is provided forwardly of the driver's seat 4.

A grass collecting container 6 is provided rearwardly of the driver's seat 4 for collecting cut grass (corresponding to a "storage section" according to the disclosure). The grass connecting container 6 is disposed at a rear portion of the vehicle body. The grass collecting container 6 is supported by a support frame body 7.
[Control Device]
FIG. 2 shows a control device C mounted on the riding type grass mower, which device C may be an ECU: electrical control unit. To the input side of the control device C, there are connected an inclination angle sensor 8 for detecting an inclination angle (θd) of the vehicle body, a load cell 9 (corresponding to a "weight sensor" according to the disclosure) for detecting a weight of collected grass inside the grass collecting container 6, and a vehicle speed sensor 10 for detecting a vehicle speed. To the output side of the control device C, there are connected a display device 12, a reporting device 12, and a braking actuator 13.

The display device 11 displays, digitally or otherwise, an inclination angle (θd) of the vehicle body detected by the inclination angle sensor 8. The display device 11 is provided on a meter panel 5.

The reporting device 12 reports that the inclination angle (θd) of the vehicle body exceeds a permissible inclination angle (θa). The reporting device 12 is constituted of e.g. a speaker.

The braking actuator 13 operates a braking device 14 for braking the traveling device 1. The braking actuator 13 can be an electrically powered cylinder, a hydraulic cylinder, etc.

As the load cell 9, in the instant embodiment, a plurality (e.g. four) of them are provided. The four load cells 9 are disposed at four corners (front left, front right, rear left and right left corners) of the support frame body 7, respectively.

The control device C includes a display instruction section 15, a reporting instruction section 16, a braking instruction section 17, a gravity center position calculation section 18, a position information acquisition section 19, a correlation section 20 and a communication section 21.

The display instruction section 15 instructs a display operation of the vehicle body inclination angle (θd) to the display device 11. The reporting instruction section 16 instructs the reporting device 12 of an alarming operation of the vehicle body inclination angle (θd) exceeding the permissible inclination angle (θa). The braking instruction section 17 instructs the braking device 14 of an braking operation when the vehicle body inclination angle (θd) exceeds the permissible inclination angle (θa). The gravity center position calculation section 18 calculates a gravity center position (plane gravity center position) of the collected grass inside the grass collecting container 6, based on detection values from the four load sensors 9.

The permissible inclination angle (θa) is set as a function of the weight of the collected grass inside the grass collecting container 6, the plane gravity center position of the collected grass inside the grass collecting container 6, and the vehicle speed. In the instant embodiment, the permissible inclination angle (θa) becomes smaller as the weight of the collected grass inside the grass collecting container 6 becomes greater, and as displacement/deviation of the plane gravity center position of the collected grass inside the grass collecting container 6 becomes greater, and as the vehicle speed becomes faster.

The position information acquisition section 19 acquires vehicle body position information (I1), when it receives a radio wave from a GPS (global positioning system) 22. The correlation section 20 correlates the vehicle body position information (I1) acquired by the position information acquisition section 19, with the information (reporting information) (Ia) whose execution was instructed to the reporting device 12 by the alarming instruction section 16. The alarming information (Ia) can be e.g. presence/absence of reporting by the reporting device 12.

The communication section 21 effects communication with a server 24 via a mobile terminal 23 carried by the operator (e.g. a smart phone, a tablet, etc.) (or not via the mobile terminal 23). The information correlated by the correlation section 20 (i.e. the position information (I1) correlated with the reporting information (Ia)) is transmitted from the communication section 21 to the server 24. At this server 24, a field map M regarding the position information (I1) and the reporting information (Ia) is created. As the communication section 21 receives the field map M from the server 24, the field map M can be utilized for safety management of utility work.

[Control Flow]

Figure 3:
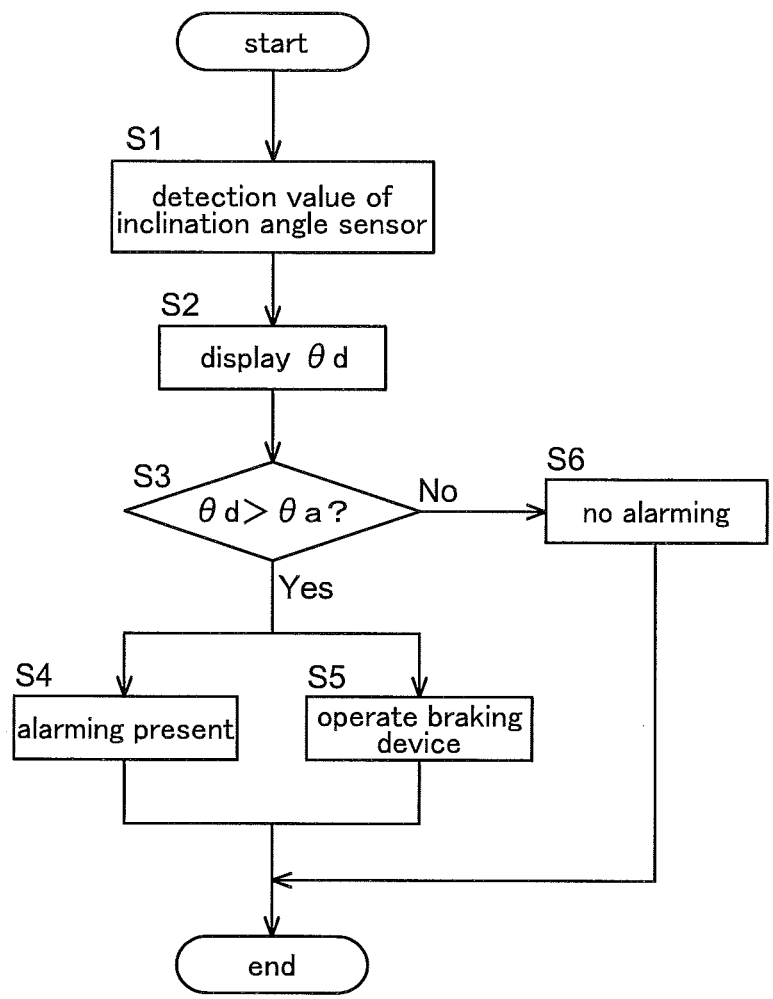
FIG. 3 is a view showing a control flow.

As shown in FIG. 3, detection values from the inclination angle sensor 8 are inputted continuously to the control device C (S1), and the display device 11 continuously displays the vehicle body inclination angle (θa) (S2).

If the vehicle body inclination angle (θa) exceeds the permissible inclination angle (θa) (i.e. θd>θa) at S3 (S3: YES), then the reporting instruction section 16 instructs a reporting operation to the reporting device 12. In response thereto, the reporting device 12 reports that the vehicle body inclination angle (θa) exceeds the permissible inclination angle (θa) (by means of e.g. a buzzer, a voice, etc.) (S4). Parallel therewith, the braking instruction section 17 instructs an braking operation to the braking device 14, whereby the braking device 14 brakes the traveling device 1 (S5).

On the other hand, if the vehicle body inclination angle (θa) is smaller than or equal to the permissible inclination angle (θa) (θd≤θa) at S3 (S3: YES), no reporting by the reporting device 12 is effected (S6).

Modifications of First Embodiment (1) In the foregoing embodiment, the reporting device 12 is comprised of a speaker. However, instead of this or in addition to this, the reporting device 12 can be comprised of a lamp.

(2) In the foregoing embodiment, the permissible inclination angle (θa) is set as a function of the weight of the collected grass inside the grass collecting container 6, the plane gravity center position of the collected grass inside the grass collecting container 6, and the vehicle speed. However, in setting the permissible inclination angle (θa), the weight of the collected grass inside the grass collecting container 6, the plane gravity center position of the collected grass inside the grass collecting container 6, and the vehicle speed can be combined in any desired manner. Namely, the permissible inclination angle (θa) can be set as a function of the weight of the collected grass inside the grass collecting container 6 alone. Or, the permissible inclination angle (θa) can be set as a function of the plane gravity center position of the collected grass inside the grass collecting container 6 alone. Still alternatively, the permissible inclination angle (θa) can be set as a function of only the vehicle speed alone. Still yet alternatively, the permissible inclination angle (θa) can be set as a function of only the weight of the collected grass inside the grass collecting container 6, and the plane gravity center position of the collected grass inside the grass collecting container 6. Or, the permissible inclination angle (θa) can be set as a function of only the weight of the collected grass inside the grass collecting container 6, and the vehicle speed. Still alternatively, the permissible inclination angle (θa) can be set as a function of only the plane gravity center position of the collected grass inside the grass collecting container 6, and the vehicle speed.

(3) In the foregoing embodiment, four load cells 9 are provided. However instead of this, one or three, or five or more load cells 9 can be provided.

(4) In the foregoing embodiment, the gravity center position calculation section 18 calculates the plane gravity center position of the collected grass inside the grass collecting container 6. Instead thereof, the gravity center position calculation section 18 can calculate a left/right gravity center position of the collected grass inside the grass collecting container 6. In this case, for instance, two load cells 9, one on the left side and the other on the right side, can be provided. Further alternatively, the gravity center position calculation section 18 can calculate a front/rear gravity center position of the collected grass inside the grass collecting container 6. In this case, for instance, two load cells 9, one on the front side and the other on the rear side, can be provided.

(5) In the foregoing embodiment, as the "plant" according to the disclosure, lawn (grass) is presumed. However, the "plant" according to the disclosure is not limited to lawn (grass).

(6) In the foregoing embodiment, the "storage section" is the grass collecting container 6. Instead thereof, the "storage section" according to the disclosure can be a storage section in which harvested products (e.g. grains or the like) are stored.

(7) The work vehicle according to the disclosure is not limited to the riding type grass mower as shown in the foregoing embodiment. The present invention is applicable also to other work vehicles such as a combine.

Second Embodiment

Figure 4:
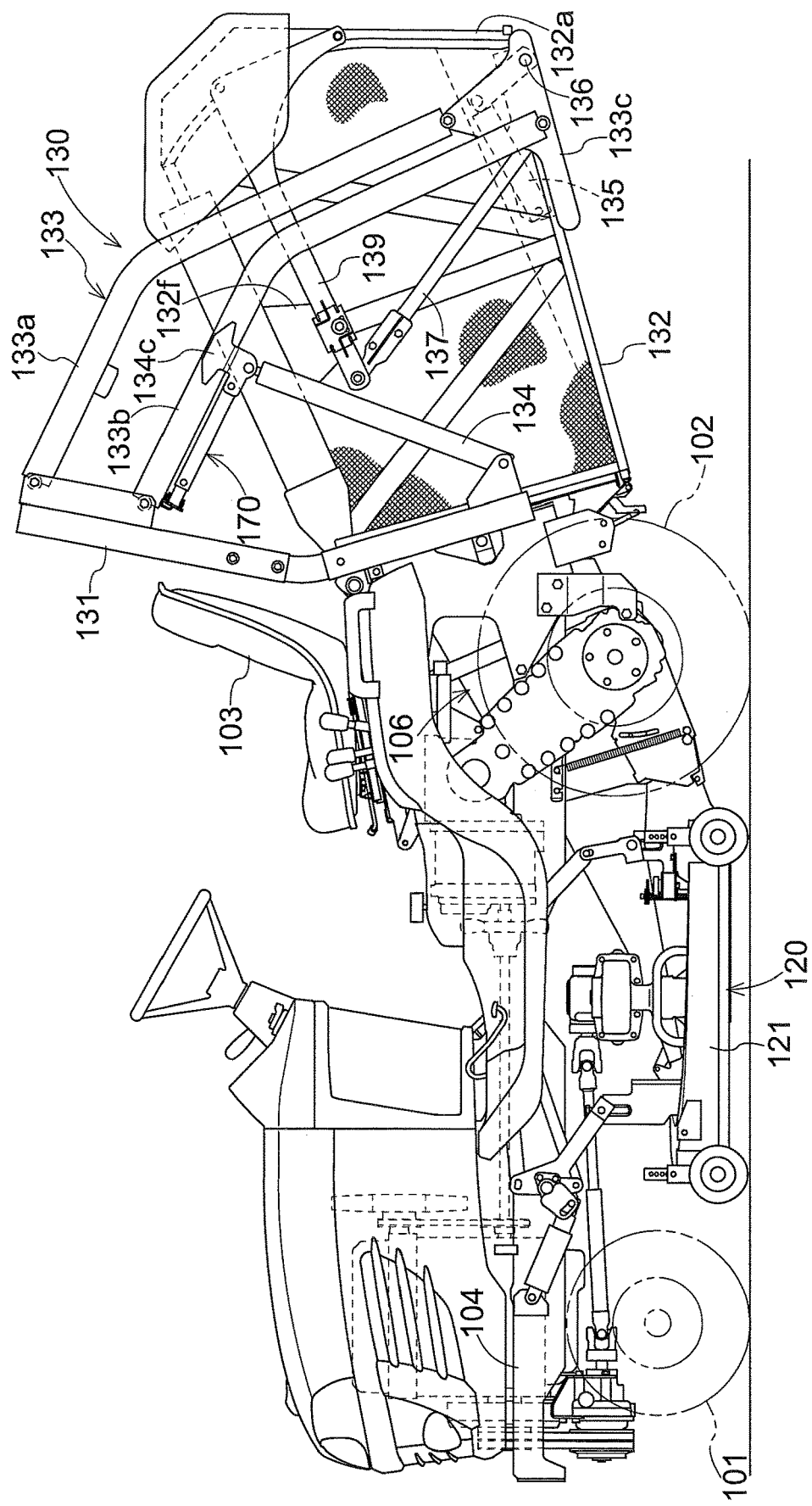
FIG. 4 is is an overall side view showing a riding type grass mower as an example of the work vehicle, according to a second embodiment (same applied to the subsequent drawings up to FIG. 11)
Figure 5:
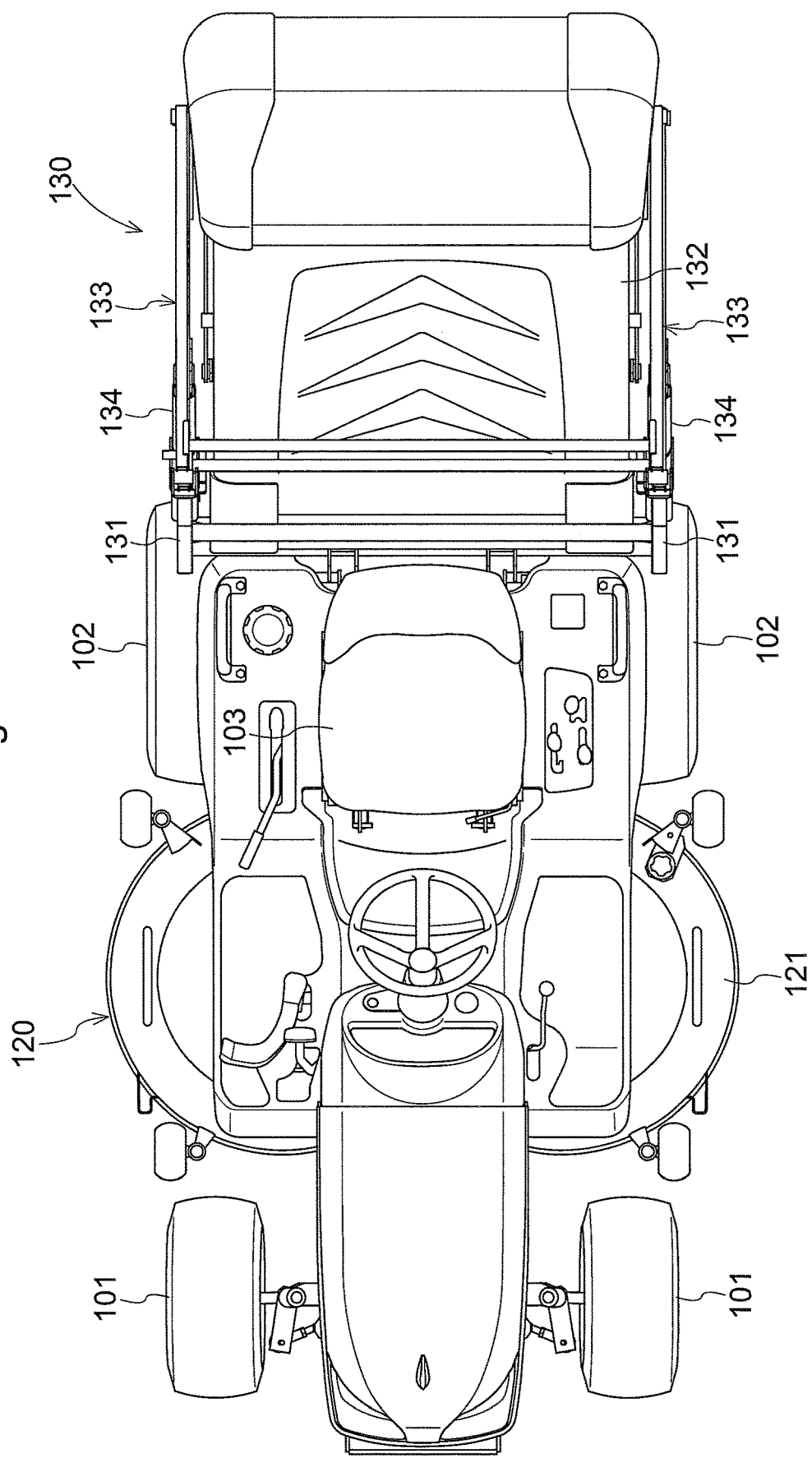
FIG. 5 is an overall plan view of the grass mower.

With reference to FIGS. 4 through 11, a second embodiment will be described next. In this embodiment, the work vehicle is a riding type grass mower (to be referred to simply as a "grass mower" hereinafter); and FIG. 4 is an overall side view of the grass mower and FIG. 5 is an overall plan view of the grass mower.

[General Configuration]

As shown in FIG. 4 and FIG. 5, this grass mower includes a riding type vehicle body configured to be self-propelled by a pair of right and left steerable front wheels 101 and a pair of right and left drivable rear wheels 102, and the vehicle body has a driver's seat 103 mounted at a vehicle body rear portion. A mower unit 120 is suspended between the front and rear wheels of a vehicle body frame 104 constituting this vehicle body; and a grass collecting container 132 is mounted at a rear portion of the vehicle body frame 104 via a support frame 131. The mower unit 120 and the grass collecting container 132 are utility implements of the grass mower.

The mower unit 120 includes a plurality of cutter blades disposed side by side along a transverse direction inside the mower deck 121. Under the air current generated by rotation of the cutter blades, grass clippings cut by the cutter blades will be conveyed through a transport duct 106 into the grass collecting container 132 to be stored in this grass collecting container 132.

[Grass Collecting Container]

Figure 6:
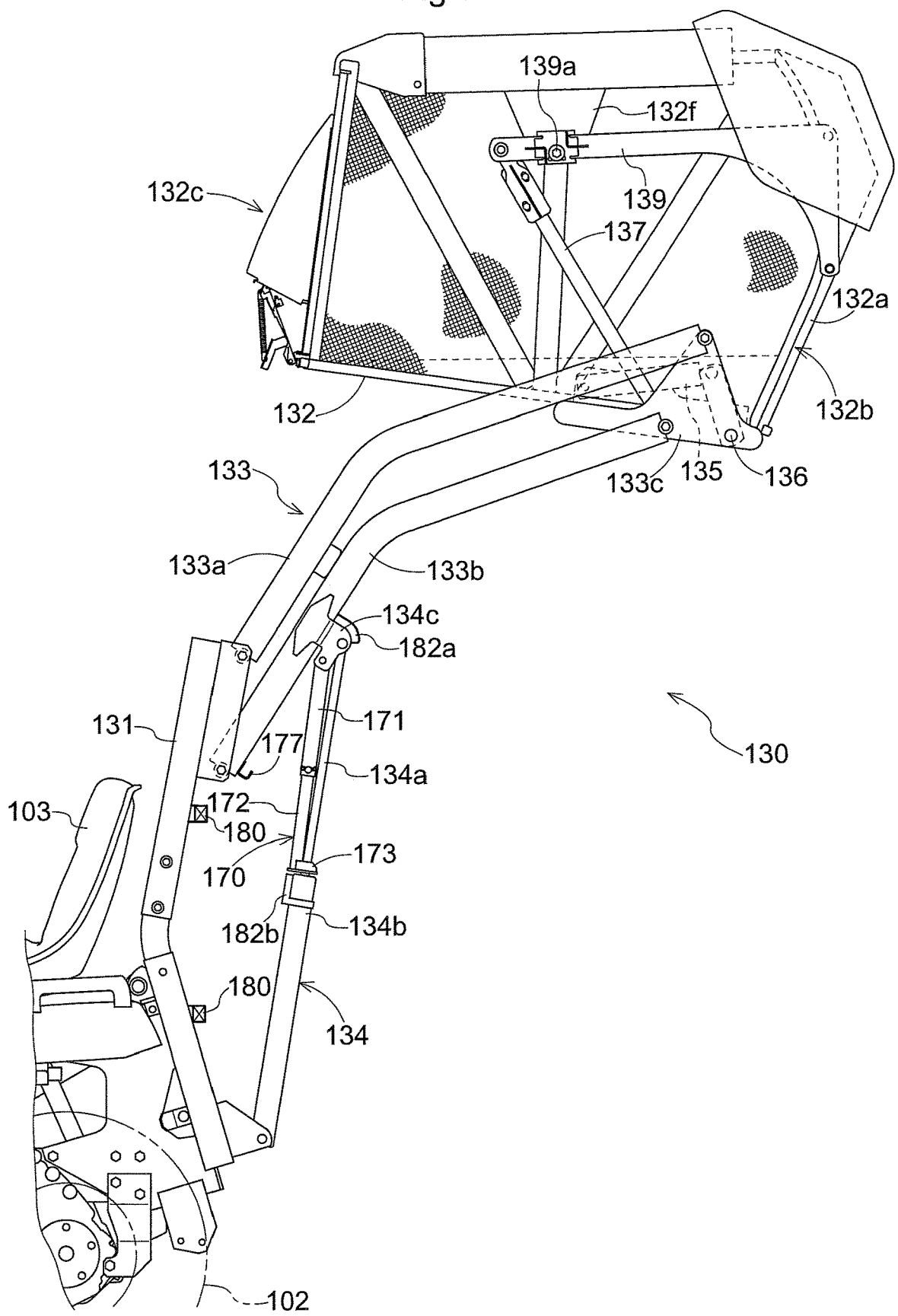
FIG. 6 is a side view showing an elevated state of a grass collecting container.

As shown in FIG. 4 and FIG. 6, the grass collecting container 132 is supported by the support frame 131 to be liftably and posture-changeably via a lift mechanism 130. The lift mechanism 130 connects an upper end portion of the support frame 130 and a rear end portion of the grass collecting container 132, via a link mechanism 133 having a pair of upper and lower lift links 133a, 133b that vertically pivotably extend from right and left sides of the support frame 131 along a vehicle front/rear direction, and via a container support body 133c connected to free end sides of the respective lift links 133a, 133b. This lift mechanism 130 includes lift cylinders 134 provided on the right and left opposed sides of the grass collecting container 132, and a single dump cylinder 135 provided downwardly of a rear portion of the grass collecting container 132. Lower end portions of cylinder bodies 134b of the lift cylinders 134 are connected to the lower end of the support frame 131; and leading end portions of piston rods 134a of the lift cylinders 134 are connected to brackets 134c fixed to the lift link 133b.

Figure 7:
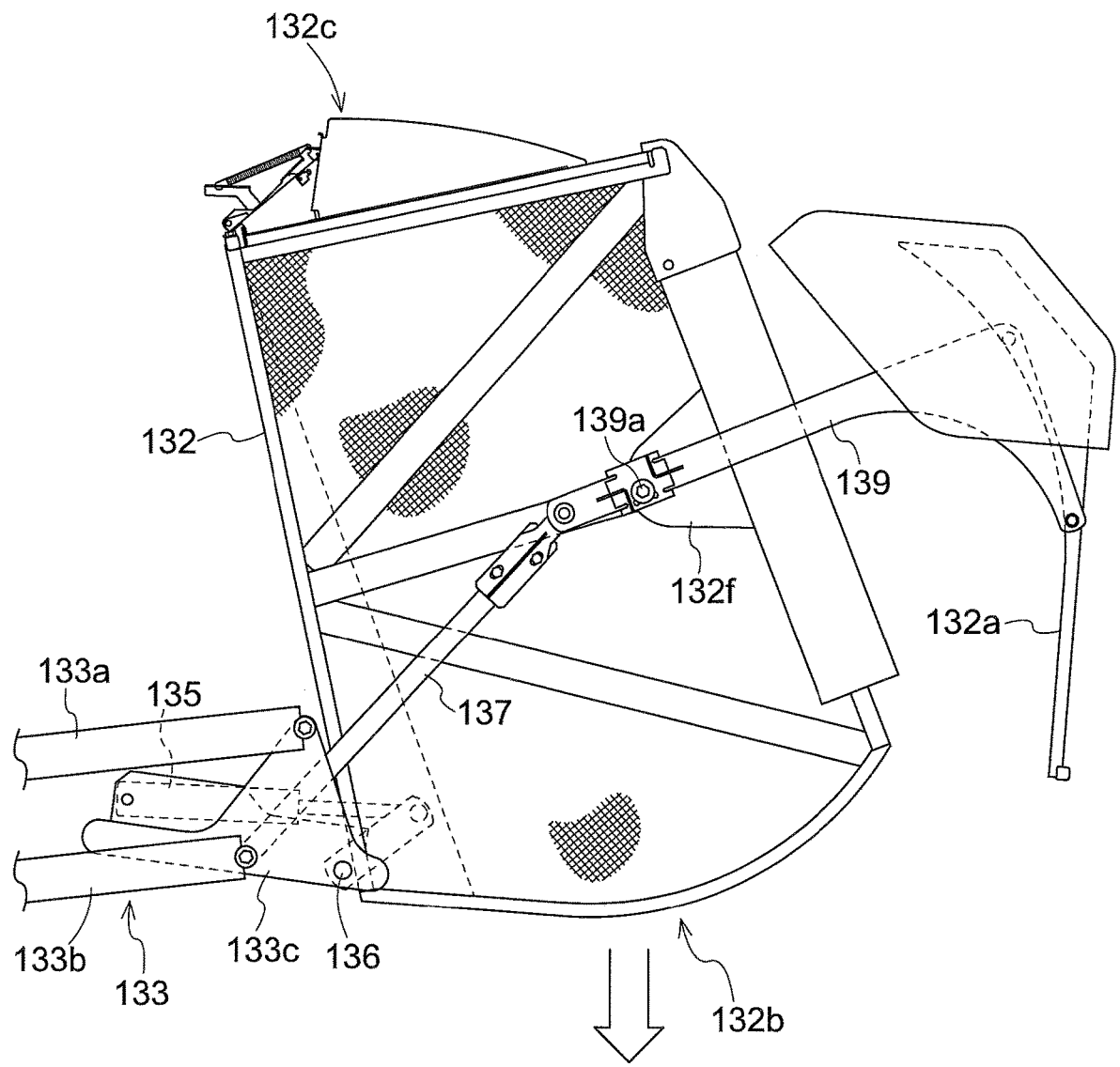
FIG. 7 is a side view showing an elevated discharging state of the grass collecting container.

As shown in FIG. 7, the lift mechanism 130 operates the grass collecting container 132 to a lowered position, by lowering the link mechanism 133 by the pair of right and left lift cylinders 134, and by pivotally lowering the grass collecting container 132 about an axis of a rotational pivot shaft 136 by the dump cylinder 135. At the lowered position of the grass collecting container 132, a cut grass entrance opening 132c, which is provided at a front portion of the grass collecting container 132, is aligned with the front direction of the vehicle body, thus being communicated to the transport duct 106, whereby grass clippings from the transport duct 106 will be introduced through the cut grass introducing opening 132c into the grass collecting container 132. When a support arm 139 of a lid member 132a for a cut grass discharge opening 132b provided at a rear portion of the cut grass collecting container 132 is pivotally operated to a closing side, about an axis of a connecting bolt 139a connecting this support arm 139 to a container frame 132f, by an opening/closing link 137 connected to the support arm 139 and the container support body 133c, the lid member 132a is closed to close the cut grass discharge opening 132b.

The lift mechanism 130 includes a lock member 170 for preventing contraction of the piston rods 134a of the lift cylinders 134 so as to prevent the grass collecting container 132 from being lowered.

[Lock Member of Lift Mechanism]

Figure 8:
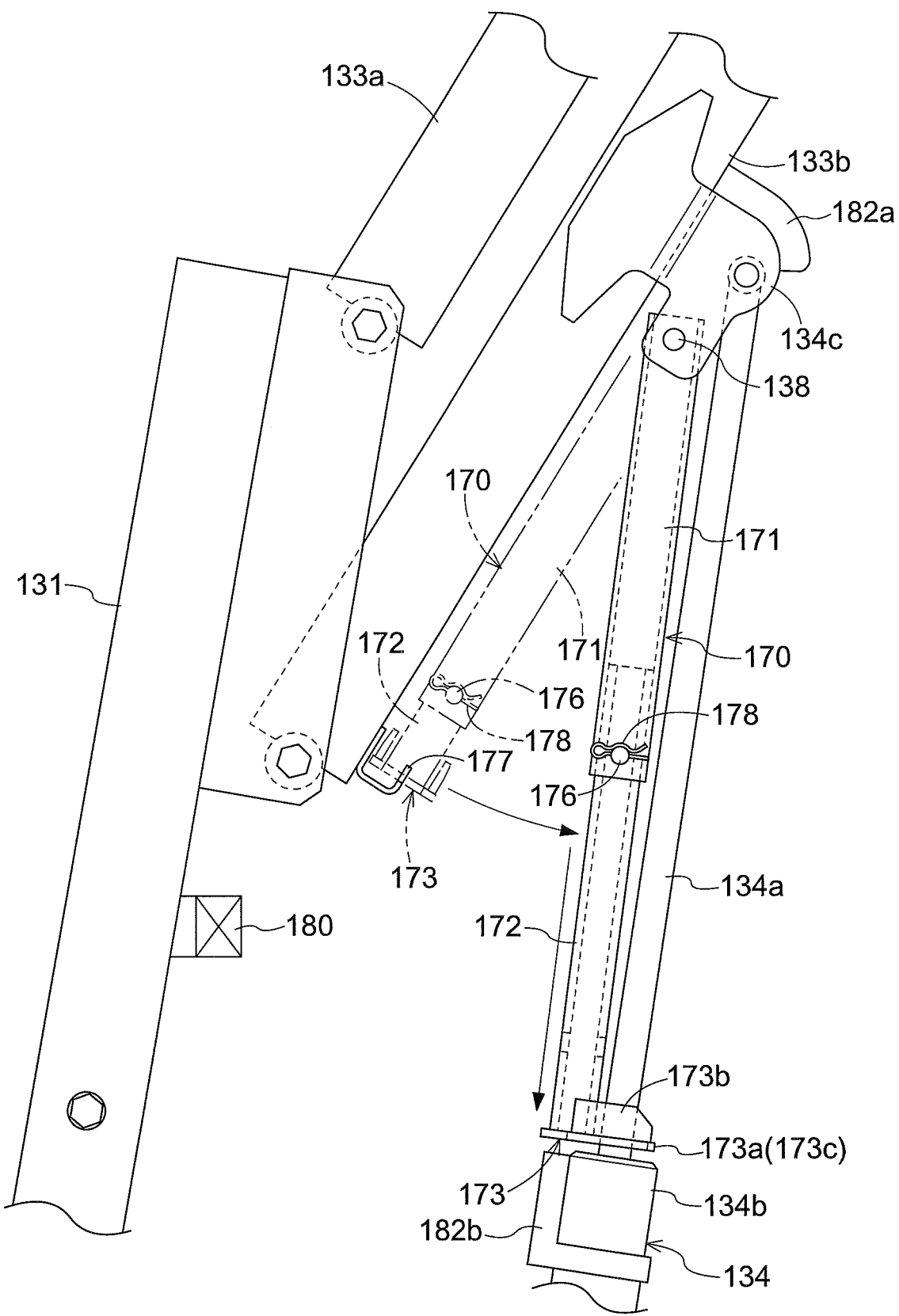
FIG. 8 is a side view showing a lock member of a lift cylinder.
Figure 9:
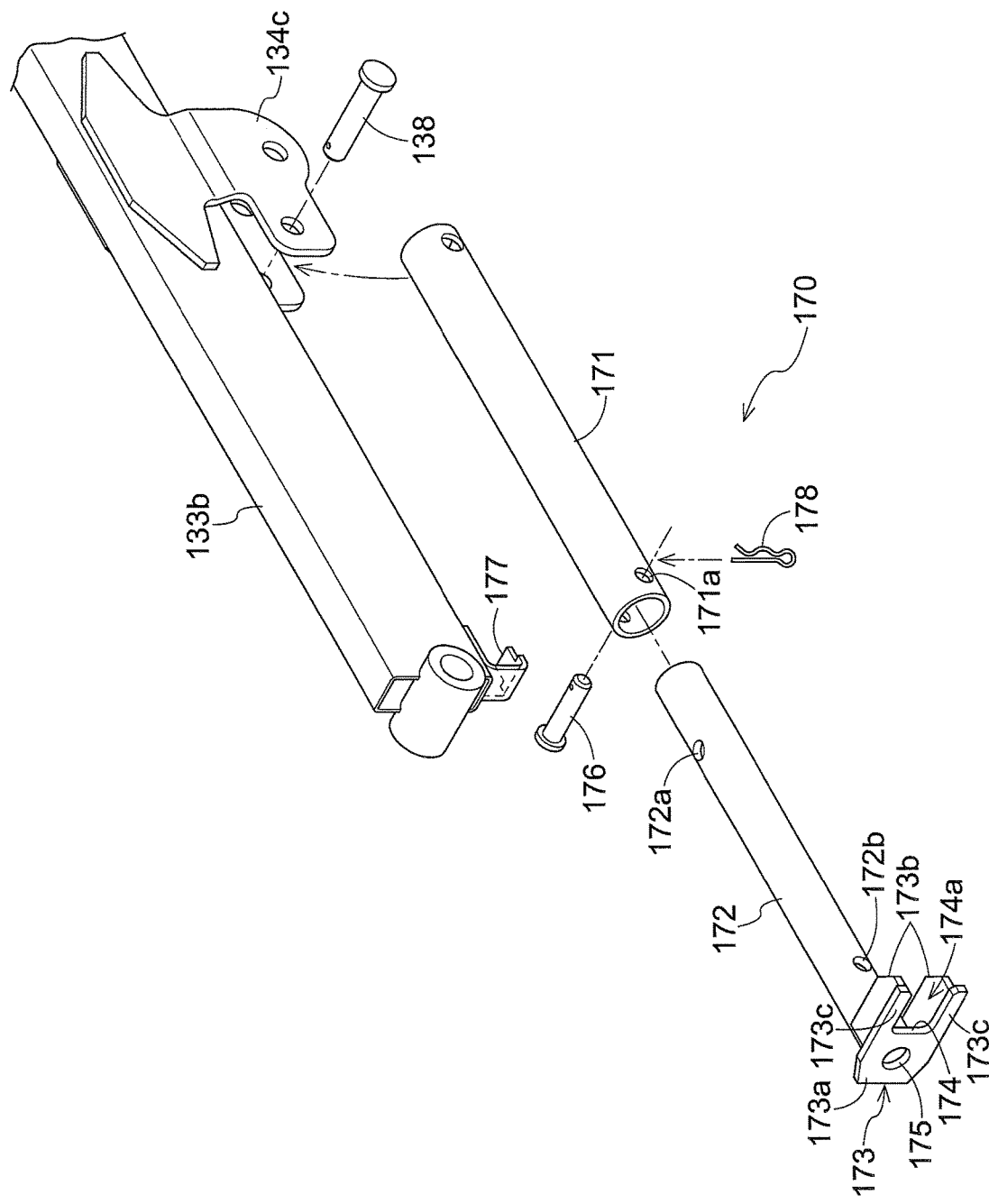
FIG. 9 is an exploded perspective view showing the lock member of the lift cylinder.

As shown in FIG. 8 and FIG. 9, the lock member 170 includes an outer tube 171 and an inner tube 172. The base end of the outer tube 171 is connected to the bracket 134c to be pivotable about a pin 138 along the vehicle body front/rear direction, which bracket 134c has a leading end portion of the piston rod 134a connected thereto. The inner tube 172 is slidably inserted into the outer tube 171, and a horseshoe-shaped stopper 173 is fixed to a leading end portion of the inner tube 172.

As shown in FIG. 9, one longitudinal end portion of a plate-like stopper piece 173a forming the stopper 173 is fixed to the inner tube 172, and the other end thereof defines an approximately U-shaped cutout recess portion 174 for receiving the piston rod 134a. A pair of load supporting arm portions 173c are formed on opposed sides of the cutout recess 174. A retaining hole 175 is formed at an intermediate portion of the stopper piece 173a to which the inner tube 172 is attached, and reinforcing ribs 173b are formed on the respective arm portions 173c.

At a free end portion of the outer tube 171, there is provided pin holes 171a for extending a retaining pin 176 therethrough. At a base end portion of the inner tube 172 engaged into the outer tube 171, a pin hole 172a is formed for allowing insertion of the retaining pin 176 together with the pin holes 171a when the inner tube 172 is withdrawn to extend from the outer tube 171. When the grass collecting container 132 is elevated and the piton rods 134a of the lift cylinders 134 protrude prominently, if the arm portions 173c of the stopper 173 and the cutout recess 174 are engaged with the piston rods 134a, there is realized a state in which the retaining pin 176 can be extended through the two pin holes 171a or the pin holes 171a are generally overlapped with each other, thus facilitating insertion of the retaining pin 176. In this way, the pin hole 171a are formed.

At a distal end of the inner tube 172, there is formed a pin hole 172b. The pin hole 172b allows insertion of the retaining pin 176 together with the pin hole 171a, when the inner tube 172 is pushed into the outer tube 171 to a position slightly before its maximal push-in position, and when the arm portions 173c of the stopper 173 and an opening portion 174a of the cutout recess 174 are oriented toward the vehicle body inner side to be placed under a first posture. The retaining hole 175 defined in the stopper 173 has a circular shape. At the base end of the lower side lift link 133b, there is formed an angular hook-shaped holding portion 177 engageable with the retaining hole 175.

When the inner tube 172 is pushed into the outer tube 171 maximally, the stopper 173 will approach the holding portion 177, but at a position distant from this holding portion 177 on the extension side. When the the inner tube 172 is pushed into the outer tube 171 maximally and the retaining hole 175 of the stopper 173 is located on the extension line of the holding portion 177, if the inner tube 172 is slightly withdrawn under this condition, the holding portion 177 can be engaged with the retaining hole 175 of the stopper 173. When the holding portion 177 and the retaining hole 175 are engaged and placed under the first posture in which the arm portion 173c of the stopper 173 and the opening portion 174a of the cutout recess 174 are oriented toward the vehicle body inner side, the two pin holes 171a, 172b can be overlapped with each other to allow insertion of the retaining pin 176 into these two pin holes 171a, 172b. Under this condition, the retaining pin 176 is inserted into the pin holes 171a, 172b and retained therein by means of a split pin (beta pin) 178, whereby the the arm portions 173c of the stopper 173 and the cutout recess 174 are fixed under the first posture oriented toward the vehicle body inner side and the lock member 170 is fixed under its contracted state. With this, the lock member 170 is placed under an unlocked state.

There will be described an operation for operating the lock member 170 from the unlocked state to the locked state next. Firstly, the lift links 133a, 133b are elevated by extending the lift cylinders 134. Then, for the lock member 170 under the storage position denoted with two-dot lines in FIG. 8, the split pin 178 will be removed and the retaining pin 176 will be removed. Then, the inner tube 172 will be slightly contracted upwards and the stopper 173 (retaining hole 175) will be removed upwards from the holding portion 177. Next, the inner tube 172 will be rotated for about 90 degrees relative to the outer tube 171. Whereby, the cutout recess 174 of the stopper 173 will be brought into opposition to the pin rod 134a of the lift cylinder 134.

Further, when the lock member 170 is pivoted about the pin 138 to the vehicle body rear side toward the lift cylinder 134, the piston rod 134a of the lift cylinder 134 will enter the cutout recess 174 of the stopper 173. Next, the inner tube 172 will be extended downwards relative to the outer tube 171 to bring the arm portions 173c of the stopper 173 into contact with the upper end portion of the cylinder body 134b of the lift cylinder 134, and the retaining pin 176 will be inserted into the pin holes 171a and the split pin 178 will be fitted to the retaining pin 176. Whereby, the lock member 170 under its extended state is rendered into the locked state. Under this locked state of the lock member 170, contraction of the lift cylinders 134 (lowering movements of the lift links 133a, 133b) is prevented.

[Control System of Grass Mower]

As shown in FIG. 6, an elevated position detection sensor 182a for detecting that the grass collection container 132 is at its elevated position is provided in the bracket 134c of the lift cylinder 134; and a lock detection sensor 182b for detecting the locked state of the lock member 170 is provided in the lift cylinder 134. The elevated position detection sensor 182a can be configured as a sensor for detecting relative positional relationship between the piston rod 134a and the bracket 134c. The lock detection sensor 182b can be a sensor configured to detect the stopper 173.

Further, as shown in FIG. 6, on the rear face of the support frame 131, there is attached a man-sensitive sensor 180 for detecting a man (a person) present nearby the grass collecting container 132. This man-sensitive sensor 180 can detect a person or an animal which enters a space under the elevated grass collecting container 132. A plurality of such man-sensitive sensors 180 can be comprised of known sensors utilizing supersonic wave, optical beam, etc.

Figure 10:
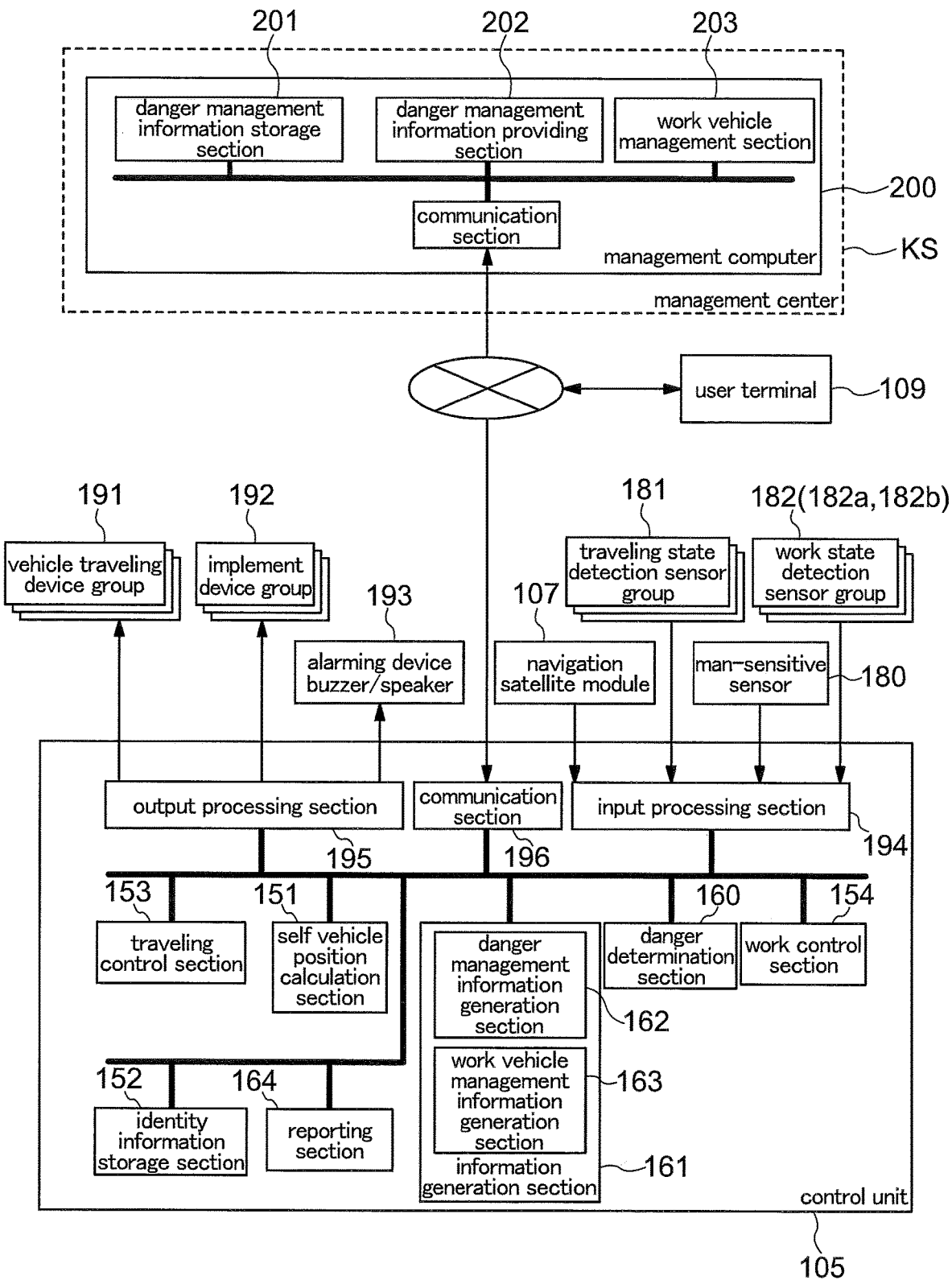
FIG. 10 is a functional block diagram of the control system of the grass mower.

FIG. 10 shows a control system configured in this grass mower. A control unit 105, which is the core component of this control system, includes an output processing section 195, an input processing section 194, and a communication section 196, which function as input/out interface. The output processing section 195 is connected to a vehicle traveling device group 191, a utility implement device group 192, a reporting device 193, and so on. Though not shown, the vehicle traveling device group 191 includes various devices controlled for vehicle traveling such as a speed changing mechanism, an engine unit, etc. The utility implement device group 192 includes a drive mechanism of the mower unit 120, the lift mechanism 130 for lifting up/down the implement, etc. The reporting device 193 includes a buzzer, a speaker, a lamp, etc. for reporting a danger avoiding alarm, in the event of occurrence of danger. The communication section 196 has functions of transmitting data processed at the control unit 105 to a management computer 200 configured in a remotely located management center KS and receiving various kinds of data from the management computer 200.

The input processing section 194 is connected to a navigation satellite module 107, a traveling state detection sensor group 181, a work state detection sensor group 182, the man-sensitive sensors 180, etc. The traveling state detection sensor group 181 includes sensors for detecting such traveling states as a rotational speed of the engine, a speed changing state, etc. The work state detection sensor group 182 includes the elevated position detection sensor 182a and the lock detection sensor 182b as described above. Further, in case a utility implement other than the grass collecting container 132 is mounted, a sensor for detecting the position and posture of such an additional implement will be provided at an appropriate position.

In the control unit 105, as control functional sections regarding the danger management, there are configured a danger determination section 160, an information generation section 161 and a reporting section 164. The danger determination section 160 determines danger, based on state detection signals from the elevated position detection sensor 182a and the lock detection sensor 182b included in the work state detection sensor group 182, and a man sensing detection signal from the man-sensitive sensor 180. In the instant embodiment, in case the grass collecting container 132 is elevated and the lock member 170 is not under the locked state, if a person enters under the grass collecting container 132 and its periphery area, it is determined that a danger has occurred. Then, when the danger determination section 160 determines danger, the reporting section 164 reports a danger avoiding alarm via the reporting device 193 in order to avoid the danger.

The information generation section 161 includes a danger management information generation section 162 and a work vehicle management information generation section 163. The danger management information generation section 162 generates danger management information by combining danger information including a content of danger determined by the danger determination section 160, and position information including a self vehicle position of this grass mower when the danger occurred. The self vehicle position is calculated by a self vehicle position calculation section 151, based on position information from the navigation satellite module 107 using a GPS (global positioning system) or the like. In case the self vehicle position calculation section 151 includes map data, not only longitude/latitude data but also a location name or the like will be outputted as the self vehicle position. Accordingly, the danger management information may include a content of the danger (someone entered the space under the grass collecting container 132), and the location and time/date of the occurrence of danger.

The work vehicle management information generation section 163 generates the work vehicle management information including identity information of the work vehicle and identity information of the driver appended to the danger management information. The identity information of the work vehicle and the identity information of the driver are inputted in advance to and stored in an identity information storage section 152. The generated work vehicle management information will be transmitted from the communication section 196 via a communication network (internet network, a mobile phone network, etc.) to the management computer 200 installed in the remotely located management center KS.

The management computer is configured as a computer system for providing a "cloud" service, and functions to collect information from users, process the collected information and provide users with the processed information. The danger management information storage section 201 reads out the danger management information from the work vehicle management information received from the grass mower (one of work vehicles registered in and managed by the management computer 200) and stores it in a form sortable according to the managed work vehicles and drivers (manager/user). For each registered work vehicle, the work vehicle management section 203 evaluates the danger occurred at that work vehicle by using e.g. a statistical method. A danger management information providing section 202 provides a content of the danger management information via the communication network to a user terminal 109 which has made access thereto. With this configuration, with using the user terminal 109, a user who has instantaneously learned the danger occurred at the work vehicle (grass mower) can directly notify the driver engaged in the work through a communication device such as a mobile phone.

The control unit 105 further includes a traveling control section 153 and a work control section 154. The traveling control section 153 controls the vehicle traveling device group 191 based on an operation by the driver. The work control section 154 provides control signals to the work vehicle device group 192 in order to control movements of the mower unit 120 and the lift mechanism 130 which are utility implements.

[Flowchart of Danger Management Routine]

Figure 11:
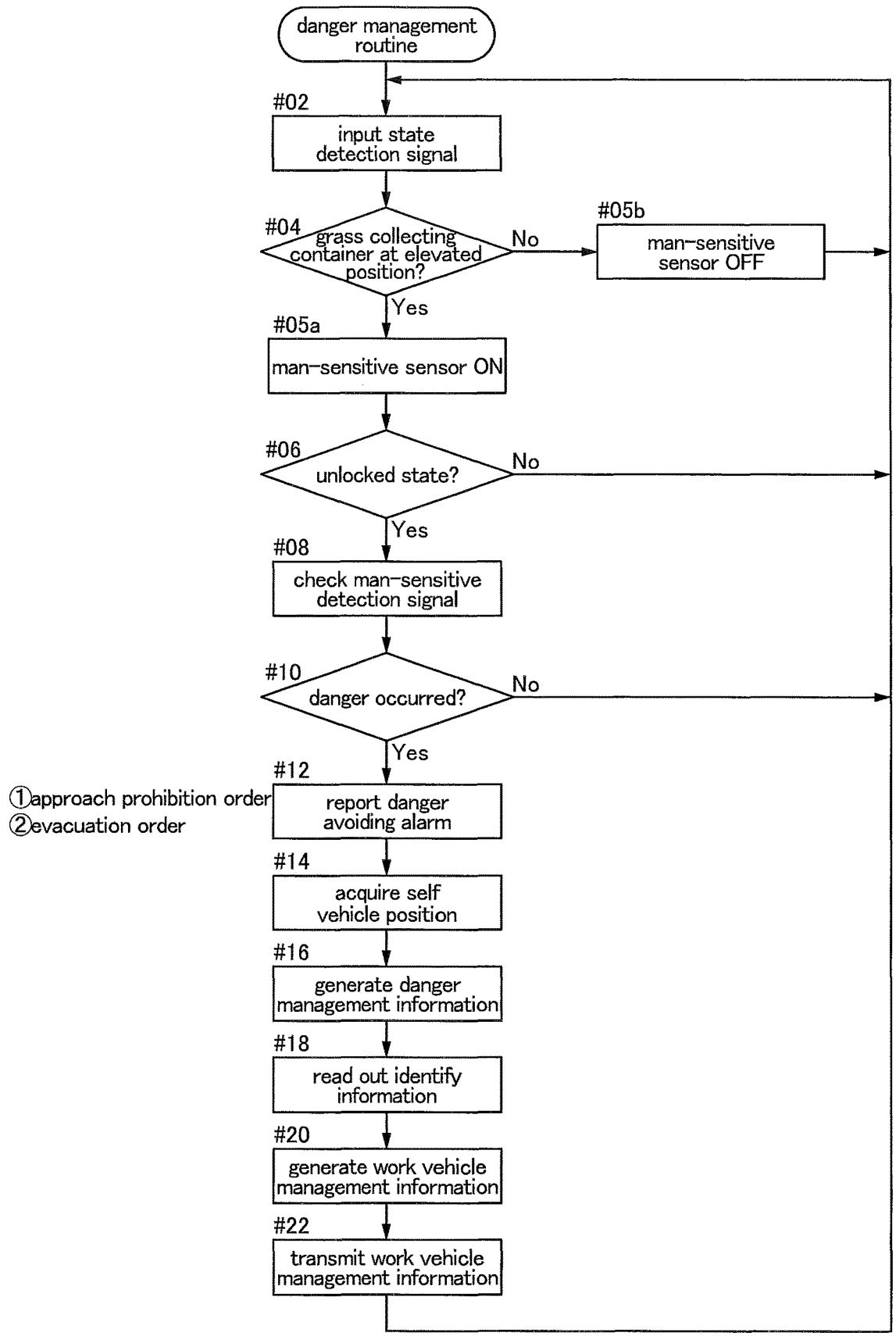
FIG. 11 is a flowchart of a danger management routine.

Next, with reference to the flowchart in FIG. 11, there will be described one example of the danger management control in this grass mower.

When a danger management routine is called, the danger determination section 160 inputs, as state detection signals, signals from the elevated position detection sensor 182a and the lock detection sensor 182b (#02). If it is determined, based on the state of the state detection signal, that the grass collecting container 132 is located at the elevated position (YES branching at #04), the man-sensitive sensor 180 is turned ON (#05a). Further, if the lock member 170 is under the unlocked state (YES branching at #06), the state of the man-sensitive signal is checked (#08). If the man sensing detection signal indicates presence of a person, then, the danger determination section 160 determines that a danger has occurred (YES branching at #10).

On the other hand, if the grass collecting container 132 is not located at the elevated position (NO branching at #04), the man-sensitive sensor 180 is turned OFF (#05b) and the process returns to step #02 to read out the state detection signals again.

Further, even if the grass collecting container 132 is located at the elevated position (YES branching at #04), if the lock member 170 is not under the unlocked state, then, it is determined that no danger is present (NO branching at #06) and, the process returns to step #02 and reads out the state detection signals again.

Still further, even if the grass collecting container 132 is located at the elevated position (YES branching at #04) and the lock member 170 is under the unlocked state (YES branching at #06), if it is determined at the state checking of the man sensing detection signal at step #08 that the man sensing detection signal does not indicate detection of a person, then, it is determined that no danger is present (NO branching at #10) and, the process returns to step #02 and reads out the state detection signals again.

Namely, when the grass collecting container 132 is located at the lowered position, the man-sensitive sensor 180 is turned OFF. Whereas, when the grass collecting container 132 is located at the elevated position, the man-sensitive sensor 180 is turned ON.

If the danger determination section 160 determines that a danger has occurred, by an instruction from the reporting section 164, a danger avoiding alarm will be reported from the reporting device 193 (#12). In this, if it is determined, based on detection by the man-sensitive sensor 180, that a person is present in the space under the grass collecting container 132, then, an order for evacuation/escape from the space will be reported. If it is determined that a person is present outside (around) the space under the grass collecting container 132, then, an order for prohibiting the person from approaching the space under the grass collecting container 132 will be reported. In case the reporting device comprises a buzzer, it will be advantageous for a buzzer sound for the evacuation/escape order to have a greater volume than a buzzer sound for approach prohibition order. Simultaneously with such an alarming report, the location and time/date of the occurrence of danger are read out from the self vehicle position calculation section 151 (#14). Further, the danger management information generation section 162 generates danger management information including the danger information that indicates the content of the danger, and the location and the time/date of the its occurrence (#16). Subsequently, identity information of the work vehicle and/or the driver is read out (#18). Then, the work vehicle management information generation section 163 combines the identity information and the danger management information read out as above to generate work vehicle management information (#20). The generated work vehicle management information is transmitted by the communication section 196 to the management computer 200 (#22).

In the foregoing embodiment, as the danger management, entrance of a person under the elevated grass collecting container 132 is taken as occurrence of danger and avoidance of this danger is handled. Needless to say, relationship between various states of other utility implements and a person can be handled as a subject matter of the danger management. If the work vehicle is different, the event handled as danger management will be different also. For instance, in the case of a backhoe or a bucket loader, entrance of a person under an elevated bucket will be the subject matter of the danger management. Moreover, in a vehicle rental shop that manages many work vehicles, by managing dangerous events with a rented work vehicle, appropriate handling of the work vehicle can be guided to a renter.

Modifications of Second Embodiment (1) In the foregoing embodiment, information transmitted from the grass mower acting as a work vehicle to the management computer 200 is the work vehicle management information. Instead thereof, the transmitted information can be danger management information, or danger information indicating the content of the danger alone. Further alternatively, the communication destination party from the grass mower can be a user terminal 109, or a mobile phone of a manager or a driver.

(2) In the foregoing embodiment, the state detection sensor for detecting a state of the work vehicle and the man-sensitive sensor 180 for sensing a person are provided as separate sensors. Instead thereof, it is possible to employ such a sensor system that is configured to recognize both a state of the implement and movement of a person from a captured image of a camera.

(3) The division of the respective functional sections in the functional block diagram as shown in FIG. 10 is only one example for facilitating description thereof. It is freely possible to combine various functional sections or to divide a single functional section into a plurality of sections, etc.

(4) The work vehicle according to the disclosure is not limited to the grass mower illustrated in the foregoing embodiment. The invention is applicable also to other work vehicles such as a fork lift, a backhoe, a bucket loader, etc.

What is claimed is:

1. A work vehicle mounting a utility implement comprising:
- a self vehicle position calculation section for detecting a self position of the vehicle;
- a work state detection sensor group for detecting states of the utility implement, the work state detection sensor group comprising an elevated position detection sensor and a lock detection sensor;
- at least one man-sensitive sensor configured to sense a person present in the vicinity of the implement;
- a danger determination section for determining danger occurring between the utility implement and a man detected by the man-sensitive sensor, based on a checking of state detection signals from the work state detection sensor group and a man-sensing detection signal from the man-sensitive sensor;
- a reporting section for reporting a danger avoiding alarm based on danger determined by the danger determination section;
- a danger management information generation section for generating danger management information by combining danger information including a content of the danger and position information containing the self vehicle position at the time of occurrence of the danger; and
- a lift mechanism configured to change a ground height of the implement to and from an elevated position, the left mechanism comprising a lock member configured to lock and unlock the lift mechanism,
- wherein, when the implement is in the elevated position, the at least one man-sensitive sensor is turned ON, and
- wherein, when the implement is in the elevated position and the lift mechanism is unlocked by the lock member, the danger determination section checks a state of the man-sensing detection signal.

2. A work vehicle of claim 1, further comprising:
- a communication section that transmits to a management computer via a communication network;
- wherein the communication section is configured to transmit, to the management computer, work vehicle management information comprised of the danger management information added with identity information of the work vehicle and identity information of the driver of the work vehicle.

3. The work vehicle of claim 1,
wherein
if the man-sensitive sensor senses a man when the implement is located at the elevated position, the reporting section reports the danger avoiding alarm.

4. The work vehicle of claim 3, wherein:
the man-sensitive sensor is configured to be turned OFF when the utility implement is located at a lowered position.

* * * * *